US007023795B1

(12) United States Patent
Hwu (10) Patent No.: US 7,023,795 B1
(45) Date of Patent: Apr. 4, 2006

(54) METHOD AND APPARATUS FOR AN ACTIVE STANDBY CONTROL SYSTEM ON A NETWORK

(75) Inventor: Nan Shan Hwu, Carlisle, MA (US)

(73) Assignee: Schneider Automation Inc., North Andover, MA (US)

( * ) Notice: Subject to any disclaimer, the term of this patent is extended or adjusted under 35 U.S.C. 154(b) by 623 days.

(21) Appl. No.: 09/707,690

(22) Filed: Nov. 7, 2000

(51) Int. Cl.
*H04L 12/26* (2006.01)

(52) U.S. Cl. .......................................... 370/219; 714/11

(58) Field of Classification Search ................ 370/216, 370/217, 218, 219, 220, 221, 225, 226, 227–228, 370/395.52, 395.53, 395.54, 222; 398/1–2, 398/10, 12, 17, 19–20; 714/2, 10, 11, 13, 714/4
See application file for complete search history.

(56) References Cited

U.S. PATENT DOCUMENTS

| | | | |
|---|---|---|---|
| 3,971,000 A | 7/1976 | Cromwell | |
| 4,319,338 A | 3/1982 | Grudowski et al. | |
| 4,688,167 A | 8/1987 | Agarwal | |
| 4,845,644 A | 7/1989 | Anthias et al. | |
| 4,858,152 A | 8/1989 | Estes | |
| 4,872,106 A | 10/1989 | Slater | |
| 4,897,777 A | 1/1990 | Janke et al. | |
| 4,912,623 A | 3/1990 | Rantala et al. | |
| 4,937,777 A * | 6/1990 | Flood et al. ................ | 710/107 |
| 4,949,274 A | 8/1990 | Hollander et al. | |
| 4,953,074 A | 8/1990 | Kametani et al. | |
| 4,958,270 A | 9/1990 | McLaughlin et al. | |
| 4,992,926 A | 2/1991 | Janke et al. | |
| 5,008,805 A | 4/1991 | Fiebig et al. | |
| 5,012,402 A | 4/1991 | Akiyama | |
| 5,023,770 A | 6/1991 | Siverling | |
| 5,047,959 A | 9/1991 | Phillips et al. | |
| 5,072,356 A | 12/1991 | Watt et al. | |
| 5,072,412 A | 12/1991 | Henderson, Jr. et al. | |
| 5,109,487 A | 4/1992 | Ohgomori et al. | |
| 5,122,948 A | 6/1992 | Zapolin | |
| 5,131,092 A | 7/1992 | Sackmann et al. | |

(Continued)

FOREIGN PATENT DOCUMENTS

DE     296 00 609 U1     3/1997

(Continued)

OTHER PUBLICATIONS

Using World-Wide Web for Control Systems,, F. Momal, C. Pinto-Pereira, AT Division CERN, 1211 Geneva 23, http://mish 231.cern.ch/Docs/ICALEPCS/1995/icalep95.htm.

(Continued)

*Primary Examiner*—Man U. Phan
*Assistant Examiner*—Toan Nguyen (57) ABSTRACT

A method and apparatus for providing an active standby control system comprising the steps of providing a first programmable logic controller and a second programmable logic controller, each controller having an operating state. A sub-network is formed by operably connecting the programmable logic controllers to an IO module with a fiber optic cable and a network connector. Data is transmitted over the sub-network at a rate of at least 100 Mb/s. A network identifier, i.e., Internet Protocol or Media Access Control address, is associated with each programmable logic controller. The network identifier of each controller is determined in response to the operating state of the respective programmable logic controller. The network connector can be a switch or a hub to assist in avoiding signal collisions and maintaining determinism on the sub-network.

8 Claims, 2 Drawing Sheets

U.S. PATENT DOCUMENTS

| | | | |
|---|---|---|---|
| 5,134,574 A | 7/1992 | Beaverstock et al. | |
| 5,148,433 A | 9/1992 | Johnson et al. | |
| 5,151,896 A | 9/1992 | Bowman et al. | |
| 5,151,978 A | 9/1992 | Bronikowski et al. | |
| 5,157,595 A | 10/1992 | Lovrenich | |
| 5,159,673 A | 10/1992 | Sackmann et al. | |
| 5,161,211 A | 11/1992 | Taguchi et al. | |
| 5,165,030 A | 11/1992 | Barker | |
| 5,179,700 A | 1/1993 | Aihara et al. | |
| 5,225,974 A | 7/1993 | Mathews et al. | |
| 5,245,704 A | 9/1993 | Weber et al. | |
| 5,251,302 A | 10/1993 | Weigl et al. | |
| 5,283,861 A | 2/1994 | Dangler et al. | |
| 5,297,257 A | 3/1994 | Struger et al. | |
| 5,307,463 A | 4/1994 | Hyatt et al. | |
| 5,313,386 A * | 5/1994 | Cook et al. | 700/82 |
| 5,321,829 A | 6/1994 | Zifferer | |
| 5,343,469 A | 8/1994 | Ohshima | |
| 5,349,675 A | 9/1994 | Fitzgerald et al. | |
| 5,367,646 A | 11/1994 | Pardillos et al. | |
| 5,386,524 A | 1/1995 | Lary et al. | |
| 5,398,336 A | 3/1995 | Tantry et al. | |
| 5,406,473 A | 4/1995 | Yoshikura et al. | |
| 5,420,977 A | 5/1995 | Sztipanovits et al. | |
| 5,430,730 A | 7/1995 | Sepulveda-Garese et al. | |
| 5,440,699 A | 8/1995 | Farrand et al. | |
| 5,446,868 A | 8/1995 | Gardea et al. | |
| 5,526,489 A | 6/1996 | Nilakantan et al. | |
| 5,528,503 A | 6/1996 | Moore et al. | |
| 5,598,536 A | 1/1997 | Slaughter, III et al. | |
| 5,611,059 A | 3/1997 | Benton et al. | |
| 5,613,115 A | 3/1997 | Gihl et al. | |
| 5,623,652 A | 4/1997 | Vora et al. | |
| 5,625,781 A | 4/1997 | Cline et al. | |
| 5,668,952 A | 9/1997 | Slane | |
| 5,673,254 A * | 9/1997 | Crayford | 370/231 |
| 5,699,350 A | 12/1997 | Kraslavsky | |
| 5,734,831 A | 3/1998 | Sanders | |
| 5,774,640 A | 6/1998 | Kurio | |
| 5,777,874 A | 7/1998 | Flood et al. | |
| 5,793,954 A | 8/1998 | Baker et al. | |
| 5,805,442 A | 9/1998 | Crater et al. | |
| 5,832,228 A | 11/1998 | Holden et al. | |
| 5,862,391 A | 1/1999 | Salas et al. | |
| 5,912,814 A | 6/1999 | Flood | |
| 5,917,997 A | 6/1999 | Bell et al. | |
| 5,926,621 A | 7/1999 | Schwarz et al. | |
| 5,950,006 A | 9/1999 | Crater et al. | |
| 5,956,491 A | 9/1999 | Marks | |
| 5,966,304 A | 10/1999 | Cook et al. | |
| 5,975,737 A | 11/1999 | Crater et al. | |
| 5,982,362 A | 11/1999 | Crater et al. | |
| 5,997,166 A | 12/1999 | Flood et al. | |
| 5,997,167 A | 12/1999 | Crater et al. | |
| 6,016,523 A | 1/2000 | Zimmerman et al. | |
| 6,028,866 A | 2/2000 | Engel et al. | |
| 6,032,203 A | 2/2000 | Heidhues | |
| 6,041,287 A | 3/2000 | Dister et al. | |
| 6,049,825 A | 4/2000 | Yamamoto | |
| 6,058,251 A | 5/2000 | Okamoto et al. | |
| 6,061,739 A | 5/2000 | Reed et al. | |
| 6,067,620 A | 5/2000 | Holden et al. | |
| 6,085,238 A | 7/2000 | Yuasa et al. | |
| 6,097,882 A | 8/2000 | Mogul | |
| 6,108,300 A | 8/2000 | Coile et al. | |
| 6,108,662 A | 8/2000 | Hoskins et al. | |
| 6,122,670 A | 9/2000 | Bennett et al. | |
| 6,151,625 A | 11/2000 | Swales et al. | |
| 6,151,640 A | 11/2000 | Buda et al. | |
| 6,157,864 A | 12/2000 | Schwenke et al. | |
| 6,167,406 A | 12/2000 | Hoskins et al. | |
| 6,169,928 B1 * | 1/2001 | Olson et al. | 700/7 |
| 6,192,027 B1 * | 2/2001 | El-Batal | 370/222 |
| 6,201,996 B1 | 3/2001 | Crater et al. | |
| 6,233,626 B1 * | 5/2001 | Swales et al. | 710/11 |
| 6,282,454 B1 | 8/2001 | Papadopoulos et al. | |
| 6,292,838 B1 | 9/2001 | Nelson | |
| 6,327,511 B1 | 12/2001 | Naismith et al. | |
| 6,353,854 B1 | 3/2002 | Cromer et al. | |
| 6,430,610 B1 | 8/2002 | Carter | |
| 6,434,157 B1 * | 8/2002 | Dube' et al. | 370/401 |
| 6,466,995 B1 * | 10/2002 | Swales et al. | 710/11 |
| 6,542,510 B1 * | 4/2003 | Fujimori et al. | 370/402 |
| 6,578,158 B1 * | 6/2003 | Deitz et al. | 714/11 |
| 6,584,019 B1 | 6/2003 | Chevallier | |
| 6,594,227 B1 | 7/2003 | Ogawa et al. | |
| 6,615,324 B1 | 9/2003 | Fernald | |
| 6,640,314 B1 * | 10/2003 | Lelaure et al. | 714/11 |

FOREIGN PATENT DOCUMENTS

| | | |
|---|---|---|
| DE | 441 0 171 C1 | 4/1997 |
| DE | 196 15 093 A1 | 10/1997 |
| EP | 0 542 657 A1 | 5/1993 |
| EP | 0 814 393 A1 | 12/1997 |
| JP | 60192447 | 9/1985 |
| WO | WO 97/18636 | 5/1997 |
| WO | WO 98/53581 | 11/1998 |
| WO | WO 00/41377 | 7/2000 |

OTHER PUBLICATIONS

LabVIEW Graphical Programming for Instrumentation, Networking Reference Manual, © Copyright 1993, 1994 National Instruments Corporation, Part No. 320587B-01, Sep. 1994.

LabVIEW Graphical Programming for Instrumentation, Tutorial for Windows, © Copyright 1993, 1994 National Instruments Corporation, Part No. 320593B-01, Sep. 1994.

LabVIEW Graphical Programming for Instrumentation, Data Acquisition VI Reference Manual for Windows, © Copyright 1992, 1994 National Instruments Corporation, Part No. 320536B-01, Sep. 1994.

Abstract of "Implementing distributed controls for FMC's using Internet utilities," S. S. Jagdale and N. Merchant; Computers of Industrial Engineering, vol.. 31 No. 1-2, p. 87-90; Oct., 1996 (UK).

Abstract of "Process Control takes to the Net," Greg Paula, Mechanical Engineering vol. 118 No. 12 Dec. 1996, p. 55.

Abstract of "Remote interrogation and control of sensors via the internet," Peter L. Furh and Euan F. Mowat; Sensors, vol. 12 No. 12, 6 pp; Dec. 1995.

Abstract of "Process control takes to the Net," G. Paula; Mechanical Engineering, vol. 118, No. 12, p. 55, Dec. 1996.

Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185-7, 1996.

Abstract of "Managing interdisciplinary project teams through the Web," R. E. Goodman and P. Chinowsky; Conference Paper, WebbNet 96-World Conference of the Web Society, pp. 180-185, 1996.

Abstract of "Learning environment for a process automation system using computer networks," J. Lindfors, L. Yliniemi and K. Leivska; Conference Paper, Step '96-Genes, Nets and Symbols, pp. 137-143, 1996 (Finland).

Abstract of "Distributed agent systems for intelligent manufacturing,"D. H. Norrie and B. R. Gaines; Canadian Artificial Intelligence, No. 40, p. 31-3, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353-8, 1996 (UK).

Abstract of "Chemical-better batch controls,"T. Crowl; Control & Instrumentation, vol. 28, No. 5, p. 53-4, May 1996 (UK).

Abstract of "Industrial software does 32-bit Windows, prepares for the net," W. Labs; I 8CS, vol. 69, No. 3, p. 23-6, 31-4, Mar. 1996, USA.

Abstract of "A case study for international remote machining;" G. C. I. Lin and Kao Yung-Chou; Conference Paper, Proc. SPIE-Int. Soc. Opt. Eng., vol. 2620, p. 553-60, 1995.

Abstract of "Standardization of long-distance protocols," R. Dinges; Journal Paper, Generation Changes in Network Conductor Systems, ITG-Fachberichte, vol. 134, p. 97-113, 1995 (West Germany).

Abstract of "Proceedings of AUTOFACT Conference," Soc. Manuf. Eng., , 684 pp., Dearborn, MI; 1993.

Abstract of "Control system design V. Communications orchestrate process control," F. Glow; In Tech, vol. 36, No. 9, p. 68-74, Sep. 1989.

Abstract of "Functions and characteristics of local networks adapted to industrial applications," J. Morlais; Electronique Industrielle, No. 97, p. 56-63, Nov. 15, 1985; France.

Abstract of "Intelligent supervisory control of submerged-arc furnaces," Markus A. Reuter, Carla Pretorius, Chloe West, Peter Dixon and Morne Oosthuizen, JOM vol. 48, No. 12, Dec. 1996, p. 49-51.

Abstract of "Simulation on the integration of process control systems of rolling mill plants through standard networks, "Choo Young Yeol, Hwang Hwa Won and Kim Cheeha, Proceedings of the Industrial Computing Conference, Instrument Society of America, Research Triangle Park, NC, USA. P 1-14; vol. 6, No. 1, 1996.

Abstract of "Environmental waste control digest," Clayton H. Billings; Public Works vol. 127 No. 7, 6 pp, Jun., 1996.

Abstract of "Experiments in tele-handling and tele-machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts-on-demand on the national network," Fred Hansen, Elias Pavlakos, Eric Hoffman, Takeo Kanade, Raj Reddy, Paul Wright; Journal of Manufacturing Systems, vol. 12 No. 4, p. 269-281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99-104; Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5, p. 475-81, Fig. 3, Ref. 7, 1995. (Japan).

Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, Part 2, 1995. (Japan).

Abstract of Users' experience with software tools for process integration. General results; Stougie, L.; Roeterink, H.J.H.; Van Wijk, A.; Stikkelman, R.M.; Nov. 1996.

Abstract of "Integrated design and process technology. vol. 1;" Cooke, D.; Kraemer, B.J.; Sheu, P.C.Y.; Tsai, J.P.; Mittermeir, R.; Society for Design and Process Science, p. 51-57; 1996. (USA).

Abstract of "Integrated design and process technology. vol. 2;" Tanik, M.M.; Bastani, F.B.; Gibson, D.; Fielding , P.J.; Society for Design and Process Science, p. 423-430, 1996. (USA).

Abstract of "Integrated design and process technology. vol. 2" Tanik, M.M.; Bastani, F.B.; Gibson, D.; Fielding, P.J.; Society for Design and Process Science, p. 306-312, 1996.

Abstract of "Need low-cost networking consider DeviceNet, " W. H. Moss; InTech vol. 43:11; p. 30-31, Nov. 1996.

"Plastic Car Bodies Pass the Crash Test," mechanical engineering; vol. 118, No. 12; Dec. 1996.

"Remote Interrogation and Control of Sensors via the Internet," Sensors and Systems; Peter L. Fuhr and Euan F. Mowat; University of Vermont; pp. 25-30; Dec., 1999.

Communication from the European Patent Office including International Search Report from WO 03/075541, mailed Aug. 21, 2003.

Kubota, Y, et al., NTT Human Interface Laboratories, "Proposal of the Robot System With Information Sending Mechanism," Presented at the 14th Annual Conference of the Robotics Society of Japan, Nov. 1-3, 1996, pp. 341-342. (In Japanese w/English translation included).

Picon, Gerard, Schneider Automation, "Java and Programmable Automation Controllers," *CiMax: Edition Terrain*, No. 13 - May/Jun. 1997 (in French w/English translation included).

Brugger, Peter, "Web Technology in Embedded Computing, " *Industrial Computer 97 - Special Edition*; Sep. 3, 1997 (in German w/ English translation included).

Williams, Tom, et al., "Java Goes to Work Controlling Networked Embedded Systems," *Computer Design*, Aug., 1996, pp. 36.

Fu, K.S., et al., *Robotics: Control, Sensing, Vision and Intelligence*, Chapter Five: Control of Robot Manipulators; Sections 5.1 - 5.3.1.

*Automation Strategies*, by Automation Research Corporation, Feb. 1998, pp. 1-32.

Lecuivre, J., et al., *A framework for validating distributed real time applications by performance evaluation of communication profiles*, Factory Communication Systems, 1995, WFCS '95, Proceedings, 1995 IEEE International Workshop on Leysin, Switzerland Oct. 4-6, 1995, New York, NY, pp. 37-46.

*Modicon Modbus Protocol Reference Guide*, Modicon, Inc., Jun. 1996, pp. 1-12.

Swales, Andy, *Topology Considerations for Modbus/ Therenet Automation Networks*, Law Controls, Inc., Jan. 25, 2000.

Beaupre, Jacques, et al., *Advanced Monitoring Technologies for Substations*, IEEE, Oct. 9, 2000, pp. 287-292.

Mostafa, W., et al., *A Taxonomy of Multicast Protocols for Internet Applications*, Computer Communications, Elsevier Science Publishers BV, Amsterdam, NL, vol., 20, No. 16, 1998, pp. 1448-1457.

Preston, David J., Internet Protocols Migrate to Silicon for Networking Devices, *Electronic Design*, vol. 45, No. 8, Apr. 14, 1997, pp. 87-90.

Klesper, Tilo, "Der Internet-Zugriff Aufs Lon Weltweiter Zugriff Auf Die Sensorik Und Aktorik Von Automatisierungs-Projekten", *Elecktronick*, vol. 47, No. 8, Apr. 14, 1998, pp. 60, 62, 64, 66.

A White Paper State Language for Machine Control, Kenneth C. Crater, President, Control Technology Corporation, Hopkinton, MA dated Jul. 9, 1999, pp. 1-11.

New PC-based Process Control & Data Acquisition Software Integrates Remote Internet Capabilities with Fast Pentium Support, Fred A. Putnam, LABTECH President, pp. 1-3.

Aug. 1996 CONTROL Magazine - In The News - Electric Utility Industry Embarks on Automation Overhaul, pp. 1-10.

Oct. 1996 CONTROL Magazine - Software Review - Article Archives, pp. 1-2.

Landis & Staefa MS 2000, pp. 1-2.

Landis & Staefa Standards and Open Protocols Integration System Architecture, p. 1.

SoftPLC Corporation - Java Support in SoftPLC Corp. Products, pp. 1-5.

Mach J. Company, MachJ, an embeddable, clean room Java Virtual Machine, p. 1.

Control Engineering Online Magazine Articles (Jul. 1998) - No. that's not a PC, it's a PLC, pp. 1-2.

Rockwell International Corporation, Allen-Bradley Introduces PLC-5/80E Controller for Ethernet Communication Networks.

Rockwell International Corporation - Automation Systems Control - General - World-Class Automation Systems from Allen-Bradley, Last Updated: May 7, 1998, pp. 1-12.

SIEMENS - SIMATIC report Jan. 1997 - New in the SIMATIC Library, pp. 1-2.

CONTROL Magazine Aug. 1998 - Field Test -DYNAMIC SOFTWARE MAKES CONTROL INTEGRATION EASIER, pp. 1-2.

Engineering Information, Inc. - Ei CPX WEB [1990-94].

"Ethernet Base Gateway Product," AEG-Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"MEB Installation and Programming Manual," Niobrara Research and Development Corporation, Sep. 24, 1997.

"MEB-TCP Installation and Programming Manual," Niobrara Research and Development Corporation, Oct. 1, 1997.

"Internet Protocol, Darpa Internet Program, Protocol Specification - RFC:791," Defense Advanced Research Projects Agency, Sep. 1981.

Design and Reuse Web Site - EDTN Network - Analyze IP Database Content - Analyse Reuse Blocks per taxonomy tree, pp. 1-10.

When Technology Standards Become Counterproductive, Kenneth C. Crater, President, Control Technology Corporation, Hopkinton, MA dated Jul. 9, 1999, pp. 1-5.

Jul. 1997 CONTROL Magazine-Magazine Software Review-NT Package Give Plant Access Through the Web, pp. 1-3.

ICS Instrumentation & Control Systems - Windows NT for real-time control: Which way to go? - ICS Magazine, pp. 1-8.

I&CS Jul. 1999 - SPECIAL REPORT SOFTWARE - Software: Open source OSs, objects, Web-based communications challenge status quo, (Wayne Labs, Senior Technical Editor), pp. 24-49.

Annabooks Bookstore, Programming and Interfacing the 8051, by Sencer Yeralan and Asutosh Ahluwalia, pp. 1-2.

SoftPLC Corporation - The History of Programmable Controllers, Looking Back From the Year 2000 A.D. (Or, How Computers Replaced Proprietary PLC'S), pp. 1-7.

SoftPLC Corporation - TOPDOC: Advanced PLC program development & documentation software, pp. 1-12.

Rockwell Automation - Search Results, pp. 1-2.

Rockwell International Corporation, Vision & Direction, The Direction of Automation Systems, pp. 1-4.

Rockwell International Corporation, Vision & Direction, The Role of Open Systems, pp. 1-4.

Rockwell International Corporation - Vision & Direction - The Direction of Automation Systems - Emergence of Application-Specific Control Solutions, pp. 1-2.

Rockwell International Corporation - Vision & Direction - The Direction of Automation Systems - The New Factory Worker, pp. 1-2.

Rockwell International Corporation, Vision & Direction, Control System Deliverables - The Next Step, pp. 1-2.

Rockwell International Corporation, Vision & Direction, Conclusion & Acknowledgments, pp. 1-2.

PC QUEST, Dec. '97 - Point, click, Control - C-Programmable controllers take the pain out of embedded control, pp. 1-2.

berthel - automation with imagination - PCI 100 - Programmable logic controller for SIMATIC/IBM IPC, pp. 1-3.

YAHOO! Personalized Search Results for programmable logic controller internet access, pp. 1-3.

"Open Modbus/TCP Specification," A. Swales, Sep. 3, 1997.

"Transmission Control Protocol, Darpa Internet Program, Protocol Specification - RFC:793," Defense Advanced Research Projects Agency, Sep. 1981.

"[comp.unix.programmer] Unix-Socket-FAQ For Network Programming," Vic Metcalfe, Andrew Gierth and other contributors, Jan. 22, 1998.

"TCP/IP Illustrated, vol. 2, The Implementation," Gary R. Wright, W. Richard Stevens, 1997.

"Winsock 2 Information," Bob Quinn, 1995-1998 (last updated Dec. 5, 1998).

Website Information of PROFIBUS: Technical Overview.

Website Information of ODVA - The Open DeviceNet's Vendor Association.

Website of PROFIBUS International - Welcome Page.

Rockwell International Corporation - Choices - Perspectives on the Future of Automation Control, 1997, p. 1.

Rockwell International Corporation - Allen-Bradley - Networks - Ethernet for Industrial Control - An Ethernet White Paper - Apr. 21, 1998, pp. 1-13.

* cited by examiner

METHOD AND APPARATUS FOR AN ACTIVE STANDBY CONTROL SYSTEM ON A NETWORK

RELATED APPLICATIONS

The subject matter of the present application is related to the following commonly assigned applications, U.S. patent application Ser. No. 09/612,636, filed on Jul. 7, 2000, entitled "A Method And Apparatus For An Active Standby Control System On A Network" and U.S. patent application Ser. No. 09/707,604, filed simultaneously with this patent application, entitled, "A Method And Apparatus For An Active Standby Control System On A Network." The contents of these Applications are expressly incorporated herein by reference.

TECHNICAL FIELD

The present invention relates to a control system. More particularly, the present invention relates to a control system utilizing a backup configuration of controllers on a network.

BACKGROUND OF THE INVENTION

Controllers such as programmable logic controllers (PLC) have been implemented in duplex or back-up system configurations where downtime of a system cannot be tolerated. Such a control system delivers high reliability through redundancy. Generally, the duplex configuration incorporates a pair of PLCs assembled in a hot or active standby, or back-up, configuration wherein one PLC is operating in a primary mode and the other PLC is functioning in a secondary or standby/backup mode. The primary controller runs an application by scanning a user program to control and monitor a remote 10 network. The other, secondary, controller acts as the active standby controller. The standby controller does not run the application and it does not operate the remote 10. The standby controller is updated by the primary controller with each scan. The standby controller is then ready to assume control of the control system within one scan if the primary controller fails to operate or is removed from operation.

The primary and secondary controllers are interchangeable and can be swapped or switched when desired. Either controller can be placed in the primary state. The active standby configuration requires the non-primary controller to be placed in the standby mode to secure the system's redundancy. The controllers continuously communicate with each other to ensure the operability of the control system. The communication among the controllers is used to determine if a swap of the controllers should be initiated due to a system failure or by election of an operator.

Factory automation systems are increasingly being integrated with communication networks. Control systems are being implemented on networks for remote monitoring and control of devices, processes, etc. System failures involving the primary mode controller that can shut down the control system are avoided by having a back-up controller readily available in hot/active standby mode to replace the failing primary mode controller.

Signal communication between device modules on a network requires network identifiers, i.e., Internet Protocol address, Media Access Control address; to be assigned to these devices throughout the network. Problems arise when the network device or controller fails and must be replaced. The failing primary controller on a network cannot be readily exchanged with a standby controller because the network identifier assigned to the network device, specifically the standby controller, is not readily associated with the primary controller.

Other drawbacks exist due to the physical structure of the control system. The control system utilizes a backplane for operably connecting modules for communicating throughout the network. Generally, data transfers are sent from a central processing unit (CPU) of the primary controller to a network interface module of the primary controller via the primary controller's backplane. A 10 Mb/sec fiber optic cable communicably links the pair of controllers wherein data flows between the network interface module of the primary controller and the network interface module of the secondary controller. From the secondary controller's network interface module, the data must again travel through a backplane to reach the CPU of the secondary controller. Communication between selected network modules involving the backplane hampers the transfer of data and adversely affects the performance of the data transfer. Due to the relatively slow backplane interface, this configuration is inadequate when faster data transfer rates on the control system are desired.

The present invention is provided to solve these and other problems.

SUMMARY OF THE INVENTION

The present invention is directed to a method and an apparatus for exchanging programmable logic controllers of a control system configured in an active standby, duplex or redundant set-up. The configuration of the control system increases the rate and reliability of the data transfer between the active and standby controllers. It is an object of this invention to provide an active standby control system integrated on a communication network capable of replacing a programmable logic controller without significantly disrupting the performance of the control system or the network.

One embodiment of the present invention is directed to a method of providing an active standby control system. A first (primary) programmable logic controller and a second (secondary) programmable logic controller, each programmable logic controller having an operating state, are operably connected to each other and to an IO module. The first programmable logic controller, the second programmable logic controller and the IO module are operably connected together with a network connector and a high speed fiber optic network cable to form a sub-network. A network identifier, i.e., Internet Protocol address, is associated with each programmable logic controller. The operating state of each programmable logic controller is sensed wherein the network identifier associated with each programmable logic controller is determined by the operating state of each respective programmable logic controller. Signal communication over the sub-network is transmitted over the fiber optic cable at a rate of at least 100 Mb/s.

The control system operates normally until a failure in the primary mode programmable logic controller is detected or a programmable logic controller exchange is selected by an operator. Upon detecting a primary mode programmable logic controller failure, the secondary mode programmable logic controller configured in active standby is substituted in place of the failed primary mode programmable logic controller. The network identifier initially associated with the original primary mode programmable logic controller is associated with the newly substituted primary programmable logic controller. Thus the network identifier of the control system's primary mode programmable logic controller remains the same regardless of which programmable logic controller is functioning as the primary mode programmable logic controller. The exchange of the programmable logic controllers is accomplished without significantly disrupting the performance of the overall control system by substantially suspending or delaying the network's operation. Accordingly, the associated network identifiers of the programmable logic controllers are also exchanged. Alternatively, the Media Access Control (MAC) address of programmable logic controllers can be exchanged.

A further embodiment of the present invention includes remote IO modules such as sensors, relays, gauges, valves, message displays, switches, AC invertors, breakers, limit switches, proximity switches, motor starters, motor controllers and any other like device as well as traditional IO modules for control systems; operably connected to the control system.

Yet a further embodiment of the present invention is directed to an active standby system for a control system. The active standby system comprises a first and a second programmable logic controller, each programmable logic controller comprises a central processing unit having an operating state. An IO module is operably connected to the first programmable logic controller and the second programmable logic controller with a high speed fiber optic network cable and a network connector. The high speed fiber optic network cable allows a signal to be transmitted over the high speed fiber optic network cable at a rate of at least 100 Mb/s.

Yet another embodiment of the present invention is directed to an active standby system for a control system. The active standby system comprises a first and a second programmable logic controller. Each programmable logic controller has an operating state. A high speed fiber optic network cable operably connects the first and second programmable logic controllers for transferring data between the programmable logic controllers at a rate of at least 100 Mb/s. A network identifier is assigned to each programmable logic controller and is responsive to the operating state of the respective Programmable logic controllers. Each programmable logic controller comprises: a processor; a co-processor; an operating system executed by the processor; and, a co-operating system executed by the co-processor wherein the operating system and the co-operating system cooperate to transfer data between the first and second controllers. The operating system and the co-operating system cooperate to increase the rate of signal transmissions by eliminating the need for the signal to be transmitted over a backplane.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION OF THE PREFERRED EMBODIMENT

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Programmable Logic Controllers (PLCs) have been integrated with control systems in an active, hot standby or backup configuration wherein the primary PLC can be swapped or exchanged by operator personnel with a readily available backup PLC when a failure to the primary PLC is detected. Factory automation networks allow operator personnel to monitor the control system from a remote site. In an active standby configuration, a pair of PLCs, PLCs are arranged in communication with each other. One of the PLCs is designated a primary PLC and actively monitors and controls a network while the other PLC functions in a hot standby mode for backing up the primary PLC. If the primary PLC fails or is taken out of service, the backup PLC will be swapped in its place without significantly disrupting network operations. An additional concern for a network is the network identifier associated with each network device. Each individual device on the network is assigned a network identifier, preferably an Internet Protocol (IP) address. Thus, the exchange of PLCs on the network also requires the exchange of their respective network identifiers. Throughout this Detailed Description, "controller" is understood to mean "programmable logic controller."

Figure 1:
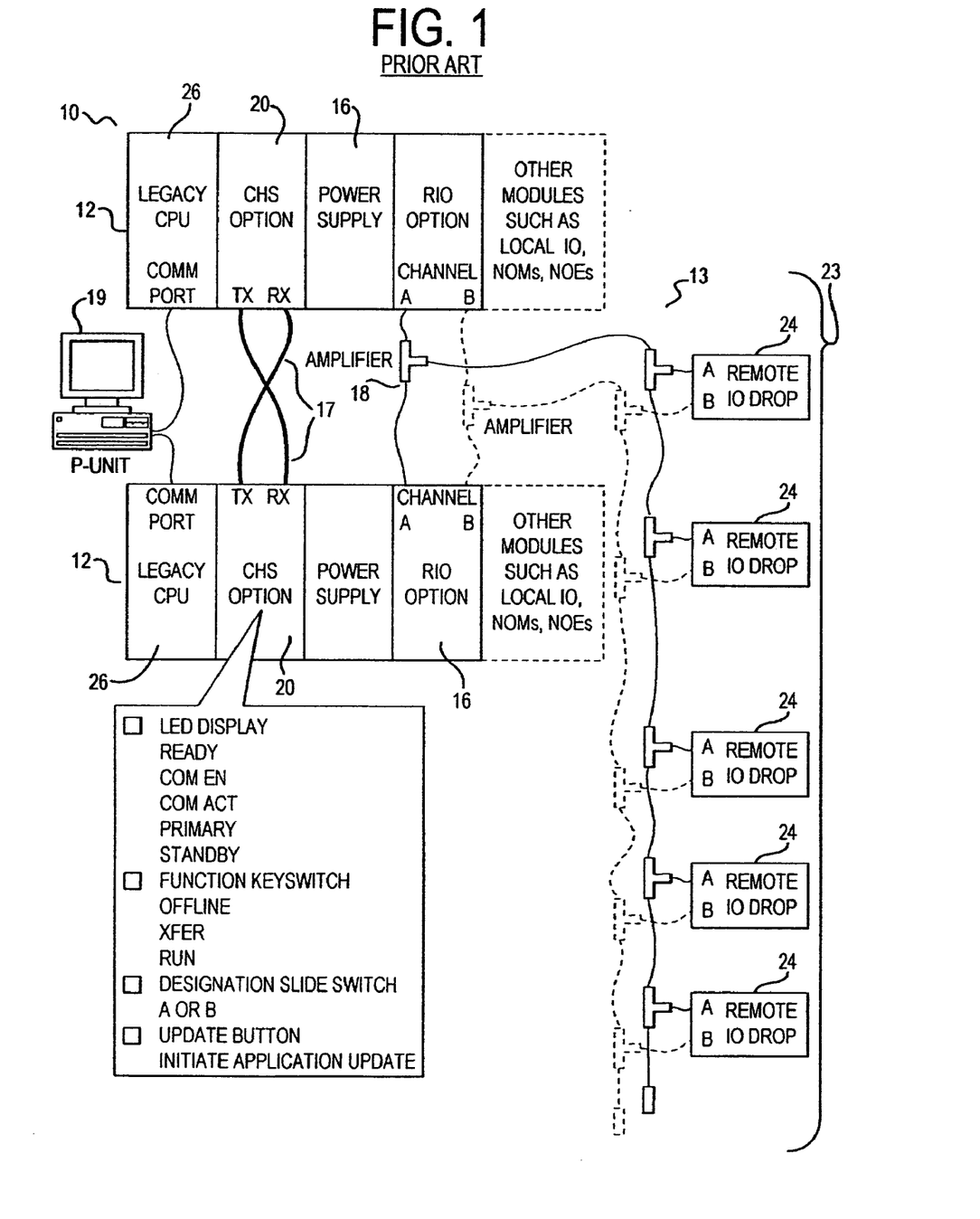
FIG. 1 is a block diagram showing an active standby control system network known by one of ordinary skill in the field of this invention prior to this invention.

Shown in FIG. 1 is an active standby control system 10 generally known by one of ordinary skill in the field of this invention. The system 10 includes a pair of controllers 12 operably connected to a network 13 in a hot standby, back-up, redundant configuration. The controller 12 also includes a central processing unit (CPU) module 26, a hot standby module 20, and a remote IO head 18. The controller's modules are positioned in a rack unit and the location of the modules within the rack unit is arbitrary such that the location of each module within the rack unit is not standard. The hot standby module 20 of each controller 12 is operably connected to each other using a fiber optic cable 17 capable of handling data transfers at a rate of approximately 10 Mb/s. The CPU modules 26 of each controller 12 are operably connected to a processor unit 19 such as a computer, personal computer or any other device having processing capabilities. The serial link 17 connection between the CPU modules 26 can be either low-speed or high-speed. The processor unit 19 always communicates with the primary controller at the same network identifier regardless of which controller 12 is functioning as the primary controller. The respective remote 10 heads 18 are also connected to each other, and to the local and remote 10 network 23, i.e., drops 24.

Existing control systems as shown in FIG. 1 utilize a backplane during data transfers from the primary to the standby controller. The modules shown in FIG. 1 are operably connected to the system 10 and each other through a backplane of each controller 12. The modules of each controller 12 must communicate with each other to successfully exchange their respective network identifiers. Determinism of the system's communication is adversely affected by delays or failures in data transfers between the controllers 12. Communication between the two controllers requires that data be sent from the primary CPU module 26 to the primary hot standby module 20 via the backplane of the controller 12, typically including an ASIC interface. The data is further transmitted to the hot standby module 20 of the secondary controller via a 10 Mb/s fiber optic link 17. The data is then transmitted through the backplane of the secondary controller and another ASIC interface of the standby controller to the CPU module 26 of the secondary controller.

Figure 2:
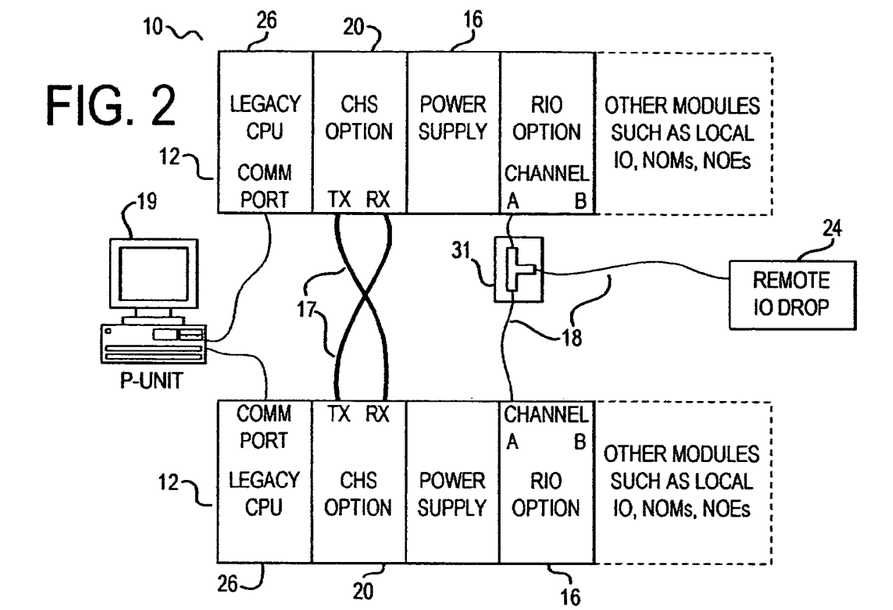
FIG. 2 is a block diagram depicting an embodiment of the present invention; and, FIG. 3 is a block diagram of an embodiment of the firmware organization of the present invention; and, FIG. 4 is a block diagram depicting an embodiment of the present invention.

FIG. 2 is directed to an embodiment of the present invention for a control system wherein the transfer rate of data between the controllers 12 is significantly increased. Each controller includes a CPU module 26. Embedded within the CPU module 26 is a dedicated hot-standby transfer port. The hot-standby transfer port of each controller 12 is operably connected via a 100 Mb/s fiber optic cable 17. A processing unit 19 is operably connected to the controllers 12, preferably through a Universal Serial Bus (USB) connection or a communication card in a PCMCIA slot. As with earlier active-standby control systems, the network processing unit 19 communicates with the primary controller 12 at the same network identifier, regardless of which controller 12 is functioning as the primary.

The present invention significantly improves data transfer rates between the controllers by incorporating a higher rated fiber optic cable 17 and eliminating a significant portion of data transfers over the backplane. Data is transmitted from the primary to the active standby CPU over the 100 Mb/s fiber optic cable 17, preferably utilizing Ethernet 100 Mb/s.

Figure 3:
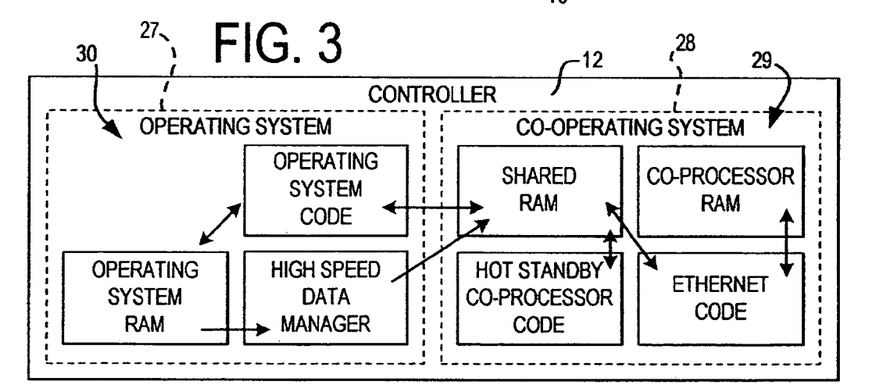

The high end CPU 26 shown in FIG. 2 comprises a processor 27, a co-processor (CoPro) 28, an operating system (OS) 30 executed by the processor 27 and a co-operating system 29 executed by the co-processor 28. The RAM of the co-processor 28 executes hot standby data transfers. FIG. 3. The processor 27 and co-processor 28 can be separate or the co-processor can be embedded within the processor. Preferably, the co-processor 28 is embedded in flash RAM. The embedded co-processor 28 handles data transfers between the primary and secondary controllers 12. The transfer of data is over the 100 Mb/s fiber optic link 17. In this configuration, the data will no longer need to be transmitted over a relatively slow backplane and ASIC interface. Instead, the data will travel from the processor's OS 30 to the co-processor's co-operating system 29 over a much higher internal data bus. The embedded modules facilitate the use of standard wiring and transfer protocols throughout the control system network, thus increasing the rate of data transfers between the controllers 12. Additionally, it is possible to transfer a complete application program stored in one controller, regardless of its size. The transfer is accomplished over multiple scans and will comprise multiple transfer data packets.

The direction of the data transfer is shown by the arrows in the FIG. 3. The main functions of the OS 30 include: moving data between the OS 30 memory and the CoPro's 28 shared memory and directed system checks when necessary. The CoPro's functions include: moving data between the primary and the standby controllers and transmitting/monitoring the health communication signal.

Specifically, the OS code initiates all hot-standby activity; prepares and controls the transfer of data to the CoPro shared memory (primary controller); retrieves data from the CoPro's shared memory and places it into the appropriate OS memory location (standby controller); interacts with the remote 10 (RIO) head 16 for active standby diagnostics; and controls serial and MB+ address changes on the controller.

The CoPro code builds messages for transmission on the Ethernet connection (primary controller); processes incoming data messages and puts data in shared memory (standby controller); monitors the health of the Ethernet communication; initiates the healthy communication message (primary controller); monitors the active standby health communication message; and is responsible for all inter-station communication, i.e., change state, application program download requests, etc.

The transfer of data from the primary controller to the standby controller is preferably by blocks and includes: state RAM (located variables); all unlocated global variables; all instances of DFB and EFB data; SFC variable area and system bits and words. It is also possible to upload the configuration and application program from the primary controller and download it to the standby controller, thus providing an identical image and enabling the standby controller to take over as the primary controller.

The main processor 30 communicates with the co-processor 28 at the beginning of every scan. If the co-processor 28 reports any error, or does not respond within a predetermined period, the primary controller will attempt to transfer control to the standby controller through the RIO link 18. If the standby controller responds, the primary controller releases control and the standby controller will operate in stand-alone mode. If the standby controller does not respond to the primary controller's request to assume control, the primary controller will operate in stand-alone mode and continue to scan the IO.

When a controller has an error, it can report the error to the other controller by sending a message to the other controller through either the fiber optic cable 17 or the RIO link 18. The controllers 12 can also identify a "failure to respond error" by detecting a time-out during the link activity. To ensure that the standby controller can detect the error as soon as possible, the primary controller is responsible for keeping the links active. This is accomplished by transmitting a health communication message to the standby controller every 10 milliseconds when no information is being sent via the fiber optic cable 17; and every 5 ms if no communication is required with any IO drop 24 or RIO link 18. If the standby controller does not receive the message in the predetermined time, it will attempt to determine the cause of the failure and assume control if necessary.

Each controller 12 has three operating states, i.e., primary, secondary and offline. In the primary state, the controller 12 is running and exchanging IO data over the remote IO network 23. In the secondary state, the controller 12 is running, but is not exchanging IO data over the remote network 23. The primary controller can exit the primary state either due to a hardware failure or a self-check failure within the controller 12. The state of the secondary controller 12 will automatically transition to the primary state if the primary mode controller 12 leaves the primary state. When the primary controller 12 changes from primary to secondary or offline, the controllers 12 will swap their respective network identifiers, preferably IP addresses, and the new primary controller 12 will resume scanning. When the controllers 12 exchange IP addresses, it appears to the remote nodes 24 as if the primary controller has been reset.

In addition, operator personnel can instruct the control system 10 to change the state of the primary control module 12. A control module 12 in the offline state cannot enter the primary state without first going through the secondary state. The allowable hot standby state transitions for the controllers 12 are: one controller is in the primary state and the other controller is in the secondary state; one controller is in the primary state and the other controller is in the offline state; and both controllers are in the offline state.

When the controller 12 changes from secondary to primary mode, the controllers will exchange their respective network identifiers within ten to fifteen milliseconds. The exchange of network identifiers requires the controller to perform various cleanup activities. When a swap occurs, the primary will reset the IO scanner's connection prior to exchanging the IP addresses. This will minimize the time required by the new primary IO scanner to establish a connection with a remote device 24. The time to reset the IO scanner's connection is in the order of several milliseconds. The IO scanner will establish new connections and start scanning in approximately 200 milliseconds. Alternatively, a reverse address resolution protocol (RARP) request can be broadcast by the primary controller to discover its IP address. In this case, the primary controller broadcasts its physical address and a RARP server replies with the primary controller's IP address.

Figure 4:
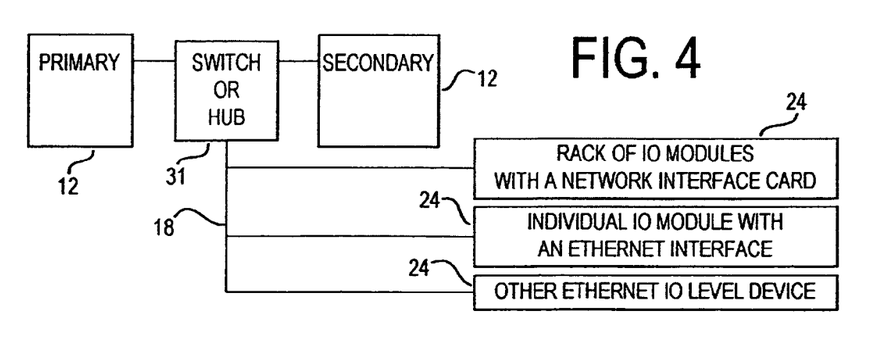

FIG. 4 shows the combination of a remote IO module 24 with the active standby control system (partially shown). The remote IO module 24 is operably connected to the active standby control system 10 via a 100 Mb/s fiber optic cable 18. A network connector 31, preferably an Ethernet switch or hub, facilitates the interconnection of the remote IO 24 with the control system 10. The operably connected first controller 12, second controller 12 and remote IO 24 form a sub-network. The Ethernet switch 31 is implemented to assist in avoiding collisions of signal transmissions on the network and maintain determinism of the network communication.

Alternatively, the Ethernet switch 31 is used in cooperation with the primary controller to control communications on the sub-network from the primary controller and to assure that all sub-network communications are managed such that only one transaction is outstanding at a time. A master-slave type application layer protocol is used in cooperation with the network connector 31 to facilitate the transmission of signals throughout the sub-network.

Various types of connectors 31 can be implemented in the control system, i.e., conventional, non-intelligent, switching intelligent, switching techniques such as cross-point (cut-through) and store and forward can be implemented. Generally, the switch 31 reads the destination address of each frame of data and initiates a switching action based upon data stored in the switch's memory, which associates destination frame addresses with destination ports. Any other switching method or switching technique can be implemented.

The configuration of the remote IO 24 via the fiber optic cable 18 ensures that both the primary and secondary controllers obtain the same IO information. The application program for executing the remote IO is present on the processor of each controller 12. The monitoring and controlling of the remote IO 24 is accomplished by the primary controller. When the IO is performed without the primary controller, the Ethernet bandwidth used is very small and generally does not affect the controllers functionality. The use of a switch for the connector 31 ensures a maximum bandwidth between the controllers during application backup.

For the redundant control system to function properly, the primary and secondary controllers must be solving an identical logic program, which is updated on every scan by a data transfer of state RAM between the two controllers. By default, the standby controller is set to go offline if a logic mismatch is detected between the programs of the standby and primary controllers. A controller swap will not occur if the non-primary controller is offline. An operator of the control system can select to override the system default for a logic mismatch and thus allow a swap between controllers 12 to occur if a logic mismatch exists between the controllers.

Under normal operating conditions, both controllers 12 have the same application program loaded. System checks are in place to detect if there is a logic mismatch. A logic mismatch can occur when the application program is initially the same on both the primary and secondary controller, but an on-line change has occurred to the program of one of the controllers. A logic mismatch can also occur when the primary and standby controllers have different applications from the onset of the control system's execution. The system's default provides that when a mismatch exists, the standby controller is placed in the off-line state and a swap of the controllers is not allowed. However, there are situations when it is desirable to allow a logic mismatch to exist and to continue to operate the system in the active standby configuration. It is important to note that if the settings are configured to ignore a logic mismatch and a swap of the controllers is executed, the standby controller will assume the role of the primary controller and will execute a different application program from the previous controller 12.

Once an active standby control system is operating, it is normally not shut down, even for periodic maintenance. However, there are conditions where the user desires to modify the application program without disrupting the control system. One situation in which a user may desire to ignore a logic mismatch between the controllers is during on-line editing of one of the controller's programs. As is readily apparent, any edits executed on-line will immediately trigger a logic mismatch between the controllers, therefore the settings on the controller must be set accordingly to allow the difference between the two programs. After the edits have been made, the user can either use an application transfer feature or the processing unit 19 to reload the standby controller with the edited primary program.

The following steps are provided as an exemplification of the on-line editing sequence and are not to be used as a limitation to the present invention as claimed and disclosed within this application. The logic mismatch feature is enabled to allow the standby controller to remain on-line in the event that a logic mismatch between the controllers is detected. The user can now make any edits or modifications to the application program of the standby controller. After completion of the edits, the new program is tested by initiating a switch-over of the controllers. If unsuccessful, another switch-over can be initiated to return to the original program. If the edits to the program work as expected, an application transfer can be executed to synchronize the programs between the controllers. Finally, the logic mismatch feature is disabled. Generally, it will not matter whether edits to the program application are first made to the primary controller or the standby controller. However, any edits made to the application program of the primary controller are immediately executed.

Another situation where it is desirable to ignore a logic mismatch is when a systematic shutdown process is implemented in the control system. The systematic shutdown process requires the primary controller to be configured to control and monitor the normal operation of the control system and the standby controller is configured to control a systematic shutdown of the control system in the event of a failure to the primary controller. When a problem with the primary controller occurs, the controllers will swap and the systematic shutdown procedure of the new controller will be executed to shut down the control system. Thus, in this type of control system configuration, a logic mismatch exists between the controllers, yet it is undesirable to place the standby controller in an off-line mode.

Some controller application programs are written wherein the programmer controls the logical and physical storage of data. The check for a logic mismatch for these types of programs examines both the data and the location of the data. Other controller programs are written wherein the programmer only controls the logical storage of the data and not the physical storage of the data. In these types of programs, the storage of the data is dynamic and controlled by the platform of which the program is run. Therefore, the detection of a logic mismatch will not include examining the physical location of the stored data.

Other situations where it is desirable to ignore a logic mismatch exists where support of off-line modified projects are being downloaded to the standby controller or when getting up to date process data transferred from the active controller.

A transfer application feature provides the user with the ability to configure the standby controller from the primary controller. The transfer application copies the full program and ensures that the controllers have identical configurations. The transfer is accomplished over the communication link, preferably a fiber optic cable 17, operably connecting the control processing units of each controller 12. The user requests the transfer through the standby controller, preferably at a front panel keypad. The complete application program and data, including state RAM, will be copied from the primary controller to the standby controller. The standby controller will then validate the transferred program and if valid, the CPU will automatically start. The user can specify the operating mode to be executed after a program transfer to either "run" or "off-line." The transfer can be executed using multiple controller scans to minimize the per scan impact on the primary controller. During the transfer, the control system is not considered redundant because the standby controller is not capable of assuming control if the primary controller fails.

Scan and transfer times of the controllers can be reduced by configuring a portion of RAM as an area not to be included in the transfer of data between the controllers. Any area of data designated as a non-transfer area will not be included during a transfer of state RAM data from the primary to the standby controller. The system operator has flexibility in determining how much or how little state RAM is selected for transfer. However, state RAM that is associated with critical IO functions should be transferred in every scan. The operator can also select how much data gets transferred in all scans and how much gets transferred in pieces over multiple scans.

The controllers' executive programs are also upgradeable without having to shutdown the control system. During the upgrade, the control system is not considered to be in a redundant configuration. If the primary controller should fail prior to the upgrade being complete, the standby controller will not be available to gain control as the primary controller.

While specific embodiments have been illustrated and described, numerous modifications come to mind without significantly departing from the spirit of the invention and the scope of protection is only limited by the scope of the accompanying claims.

I claim:

1. An active standby system for a control system, the active standby system comprising:
   a first programmable logic controller and a second programmable logic controller, the first programmable logic controller being in an active state, the second programmable logic controller being in a standby state each controller having an operating state;
   an IO module;
   a network connector, wherein the network connector is a switch for controlling signal communication over a high speed fiber optic network cable to avoid signal collisions and maintain determinism throughout the fiber optic network; and,
   the high speed fiberoptic network cable for operably connecting the first programmable logic controller, the second programmable logic controller and the IO module, wherein a signal is transmitted over the high speed fiber optic network cable at a rate of at least 100 Mb/s.

2. A method of providing an active standby control system comprising the steps of:
   providing a first programmable logic controller and a second programmable logic controller, each controller having an operating state the first programmable logic controller being in an active state, the second programmable logic controller being in a standby state;
   providing an IO module; and,
   operably connecting the first programmable logic controller, the second programmable logic controller and the IO module through a network connector and a fiber optic network cable, the operably connected first programmable logic controller, the second programmable logic controller, the IO module, the fiber optic cable and the connector forming a sub-network; wherein data is transferred throughout the sub-network at a rate of at least 100 Mb/s; and
   providing a switch for controlling signal communication over the fiber optic network cable to avoid signal collisions and maintain determinism on the sub-network.

3. A method of providing an active standby control system comprising the steps of:
   a first programmable logic controller and a second programmable logic controller, the first programmable logic controller being in an active state, the second programmable logic controller being in a standby state each controller having an operating state;
   providing an IO module;
   operably connecting the first programmable logic controller, the second programmable logic controller, the IO module and a network connector with a fiber optic network cable and forming a sub-network, wherein the network connector is a switch for controlling signal communication over the fiber optic network cable to avoid signal collisions and maintain determinism throughout the sub-network, and wherein data is transferred throughout the sub-network at a rate of at least 100 Mb/s;
   controlling signal communication over the sub-network;
   assigning a network identifier to each controller;
   placing one the first programmable logic controller in primary mode and the other the second programmable logic controller in secondary mode;
   sensing the operating state of each the first programmable logic controller, wherein the network identifier of each the first programmable logic controller is selected in response to the operating state of each respective the first programmable logic controller;

exchanging the network identifiers between the first programmable logic controller and the second programmable logic controllers; and, transmitting a reverse address resolution protocol (RARP) message.

4. The method of claim 3 wherein the sub-network is an Ethernet network.

5. The method of claim 3 wherein the network identifier is an Internet Protocol address.

6. The method of claim 3 wherein the network identifier is a Media Access Control address.

7. The method of claim 3 wherein the network connector is a hub for controlling signal communication over the sub-network.

8. The method of claim 3 further comprising a master-slave type application layer protocol to ensure that only one signal is being transmitted at a time.

* * * * *